United States Patent [19]

LaPorte

[11] Patent Number: 4,968,970
[45] Date of Patent: Nov. 6, 1990

[54] METHOD OF AND SYSTEM FOR POWER LINE CARRIER COMMUNICATIONS

[75] Inventor: Eric LaPorte, Roswell, Ga.

[73] Assignee: Schlumberger Industries, Inc., Norcross, Ga.

[21] Appl. No.: 343,202

[22] Filed: Apr. 26, 1989

[51] Int. Cl.$^5$ .............................................. H04M 11/04
[52] U.S. Cl. .............................. 340/310 A; 340/310 R; 340/310 CP; 375/36
[58] Field of Search ........ 340/310 A, 310 R, 310 CP, 340/538, 825.06, 825.07, 825.08, 825.2; 375/1, 36, 37; 371/2, 5, 47, 48, 2.1, 2.2, 5.1, 6, 47.1, 48

[56] References Cited

U.S. PATENT DOCUMENTS

| | | | |
|---|---|---|---|
| 4,641,322 | 2/1987 | Hasegawa | 375/1 |
| 4,760,586 | 7/1988 | Takeda | 375/1 |
| 4,763,103 | 8/1988 | Galula et al. | 340/310 A |

*Primary Examiner*—Donnie L. Crosland
*Attorney, Agent, or Firm*—Sanford J. Asman

[57] ABSTRACT

The transmitter in a power line communications system applies to the power line encoded logical-one and logical-zero bit signals consisting of signals formed respectively of predetermined different sequences of frequencies. The receiver, coupled to the power line, includes a first homodyne, non-coherent, quadratic demodulator for demodulating the logical-one bits and a second for demodulating the logical-zero bits. The first demodulator produces, locally, and in first and second channels, respectively, a first reference signal that is a replica of the logical-one bit sequence of frequencies and a second reference signal that is the replica in quadrature. The second demodulator produces, locally, and in third and fourth channels, respectively, cooresponding third and fourth reference signals for the logical-zero bit sequence. Each of the four reference signals is applied to a corresponding analog multiplier for multiplication by the input signal in each channel. The output of each multiplier is applied to a low pass filter that passes only the dc component of the product signal which in turn is squared. The resultant signals in the first and second channels are summed to provide a first output signal, and the resultant signals in the third and fourth channels are summed to provide a second output signal. Compensation circuitry cancels error voltages developed in the demodulatin channels as a result of component offset, and the two output signals are integrated over a bit period and then compared to each other to detect a logical-one or logical-zero bit.

27 Claims, 5 Drawing Sheets

METHOD OF AND SYSTEM FOR POWER LINE CARRIER COMMUNICATIONS

TECHNICAL FIELD

This invention relates generally to power line carrier communications, and more particularly to a power line carrier communications method and system using frequency hopping type spread spectrum signal modulation and demodulation.

BACKGROUND ART

In some types of communication networks, data stored in remote, data accumulation units are downloaded to a central computer or record keeping unit, periodically or on demand. For example, in electricity or other utility meter reading systems, to which the present invention is particularly advantageous but not necessarily limited, remote watthour meters are polled by a central computer which maintains customer electricity consumption records for billing. Typically there has been one centralized meter for each single-family home or for each apartment building occupied by a number of families, as well as for each single or multi-tenant commercial property, polled by a regional computer. It is preferable to monitor the electricity consumption of each user, rather than a community of users, to produce more equitable, individualized billing. However, it frequently is impractical to install separate meters in individual units, particularly in older apartment buildings, because there usually is no separate data communication line between each unit and a central site. Rewiring of the building is cost prohibitive. Accordingly, power lines provided to each unit and to which all meters are connected are used by the meters for transmitting electricity consumption data to a central computer. This is carried out by a transmitter in each meter which injects on the power lines a carrier signal modulated by data identifying the meter and reporting its consumption within a predetermined billing period.

However, power lines are electrically noisy so that it is difficult to establish a reliable communications link between the meters and the central computer using a reasonably small amount of signal power. Furthermore, the noise spectrum of the power lines changes with time of the day and season of the year depending on operation of electrical equipment connect, or located in proximity, to the power lines. For example, power line network characteristics have variations in attenuation as a function of frequency, with pronounced dips in transmission of some frequencies that vary among networks. Noise injected on the lines includes fixed frequency noise resulting, for example, from the switching of inductive loads. Other noise arises at harmonics of the frequency of the network, and there is gaussian background noise as well as fluctuating signals caused by televisions and the like operating on the power lines.

Accordingly, one object of the invention is to provide a method of and system for establishing reliable communications between local and remote data reporting equipment. Another object of the invention is to provide reliable power line communications method and apparatus suitable for centralized meter reading.

To improve reliability of data communications on the power lines, wide band transmission of digital information carried out using "frequency hopping" type spread spectrum signal processing wherein logical-one and logical-zero bits each encoded into multiple frequency elements or "hops" (sometimes called "chips") within two different frequency bands is disclosed in Galula et al. U.S. Pat. No. 4,763,103. Therein as described, at transmission each information element to be sent is encoded by a sequence of several different predetermined coding frequencies, wherein one sequence represents a logical-one bit and another represents a logical-zero bit. The two sequences of frequencies are within two different bands that are frequency spaced apart from each other. Within the two sequences, signals of equal rank, i.e. the same frequency position, must be different from each other to maintain a detectable degree of difference between the logical-one and logical-zero sequences. The sequences are demodulated at a receiver coupled to the power line by correlation with locally generated signals that produce, with a substantially constant frequency shift, the particular frequency combinations and the value of the information element being determined as a function of the correlation output.

Although generally satisfactory, the Galula et al. system is relatively complex, requires constraint in selection of frequencies forming the sequences and under certain circumstances may interpret received bits incorrectly. Complexity is a result of heterodyne signal demodulation that requires intermediate frequency conversion and amplification prior to correlation. The selection of frequencies is limited to frequencies within two different bands. Signal components which occupy one of the band are applied to one of the demodulators while the other components which occupy the other band are applied to the other demodulator, and as mentioned hereinabove the frequencies are not arbitrarily selectable since at least frequencies in corresponding ranks within the two bands must not be the same. Finally, a correlation decision is made in Galula et al. based on whether energy content following reception of each "chip" is above or below a predetermined threshold value. The value of a bit may become ambiguous and depend on the accuracy of the threshold if the number of decisions favoring one bit value or the other is near one half the total number of chips per bit. Accordingly, it becomes advantageous or necessary to limit the number of frequencies, or "chips", forming a bit to consist of an odd number of frequencies. In some cases, the decision may identify a logical-one or logical-zero bit incorrectly as noise.

A further object of the invention, therefore, is to provide a power line carrier communication method and system having improved immunity to line noise.

Another object of the invention is to provide more accurate bit detection in a frequency hopping type power line communication system.

A further object is to provide a frequency hopping type power line communication system that has simplified demodulation circuitry and wherein demodulation can be carried out in part by software.

Still another object is to provide a frequency hopping type power line communication system that has its frequencies distributed in a common band and minimum frequency selection constraints.

DISCLOSURE OF THE INVENTION

The above and other objects of the invention are satisfied in a system for wideband transmission of data on an electricity distribution network comprising at least one transmitter for generating encoded signals corresponding respectively to logical-one bits and logical-zero bits. Each encoded signal corresponding to a logical-one bit consists of a first predetermined, unrelated sequence of frequencies and each encoded signal corresponding to a logical-zero bit consists of a second, different predetermined and unrelated sequence of frequencies. The output of the transmitter is coupled on the electricity distribution network and at least one receiver coupled to the network receives from the transmitter input encoded signals.

In accordance with one embodiment of the invention, the receiver includes a first demodulator in at least a first frequency channel for converting the logical-one bit signals into corresponding first dc signals, a second demodulator in at least a second frequency channel for converting the logical-zero signals into corresponding second dc signals, and offset compensation circuitry for compensating the receiver for an offset voltage developed as a result of component offsets therein. A comparator is provided for comparing output signals from the first and second channels indicating a logical-one or logical-zero bit.

In accordance with a more specific embodiment of the invention, the receiver includes a homodyne demodulator system comprising a first demodulator with first and second channels for demodulating logical-one bit signals. In the first channel, a first local signal generator provides a first reference signal that is a replica of the encoded logical-one bit signal, a first multiplier for forming a product of the input encoded signal and the first reference signal, a first filter coupled to an output of the first multiplier for passing substantially only a first dc component therefrom, and a first squaring circuit for squaring the first dc component. In the second channel, a second local signal generator provides a second reference signal that is, in quadrature, a replica of the said encoded logical-one bit signal, a second multiplier for forming a product of the input encoded signal and the second reference signal, a second filter coupled to an output of the second multiplier for passing substantially only a second dc component therefrom, and a second squaring circuit for squaring the second dc component. A first summer is provided for summing outputs of the first and second squaring circuits, and a first integrator accumulates from the first summer first output signals corresponding to the first sequence of frequencies.

The receiver further includes a second demodulator having third and fourth channels for demodulating the logical-zero bit signals. In the third channel, a third local signal generator provides a third reference signal that is a replica of the encoded logical-zero bit signal, a third multiplier for forming a product of the input encoded signal and the third reference signal, a third filter coupled to an output of the third multiplier for passing substantially only a third dc component therefrom, and a third squaring circuit for squaring the third dc component. In the fourth channel, a fourth local signal generator provides a fourth reference signal that is, in quadrature, a replica of the encoded logical-zero bit signal, a fourth multiplier for forming a product of the input encoded signal and the fourth reference signal, a fourth filter coupled to an output of the fourth multiplier means for passing substantially only a fourth dc component therefrom, and a fourth squaring circuit for squaring the fourth dc component. A second summer is provided for summing outputs of the third and fourth squaring circuits and a second integrator accumulates from the second summer second output signals corresponding to the second sequence of frequencies. The integration periods of the first and second integrators is equal to the number of sequences forming a bit. A comparator is provided for comparing output signals from the first and second integrators for indicating a logical-one or logical-zero bit. The comparator thus establishes a bit decision based upon all "hops" of the sequence forming a bit rather than upon a comparison of the energy content individually of successive hops in logical-one and logical-zero bits.

In accordance with a further aspect of the invention, offset compensation circuitry compensates the receiver for any error voltage developed as a result of receiver component offsets. The offset compensation circuitry preferably includes a circuit for shunting an input of the receiver to provide a "zero input" thereto whereby the output voltage developed by the receiver is attributed only to offset voltage produced therein. This offset is then calculated by a micro-processor, and the offset compensation is carried out by software.

In accordance with another aspect of the invention, the receiver and transmitter of the system both are synchronized to electricity on the electricity distribution network. Preferably, synchronization circuitry in the system includes a zero crossing detector synchronized to zero crossings of electricity on the electricity distribution network for generating line synchronization pulses. A phase locked loop responsive to the line synchronization pulses controls generation of encoded signals by the transmitter.

In accordance with another aspect, a limiter circuit is provided for limiting the input signal applied to the receiver. A transformer couples the encoded signals from the electricity distribution network to the receiver, and a band pass filter between the transformer and the receiver limits the frequency range of the input signals.

In accordance with a further aspect of the invention, the transmitter includes a frequency synthesizer for generating respectively the logical-one and logical-zero encoded signals. At the receiver, front end demodulation is carried out in hardware, and the remainder of the demodulation is implemented in software.

In accordance with the method of the invention, wide band data transmission on an electricity distribution network is carried out by generating encoded signals corresponding respectively to logical-one bits and logical-zero bits, wherein each encoded signal corresponds to a logical-one bit consisting of a first predetermined, unrelated sequence of frequencies and each encoded signal corresponds to a logical-zero bit consisting of a second, different predetermined, unrelated sequence of frequencies. The encoded signals are coupled on the electricity distribution network and input encoded signals on the electricity distribution network are received.

Receiving, in accordance with the invention, includes establishing first and second frequency channels for demodulating the logical-one bit signals and third and fourth channels for demodulating the logical-zero bit signals. Provided in the first channel are a first reference signal that is a replica of the encoded logical-one bit signal and a first product signal that is a product of the input encoded signal and the first reference signal. The first product signal is filtered for passing substantially only a first dc component thereof which is squared to obtain a first output signal. Provided in the second channel are a second local signal that is, in quadrature, a replica of the encoded logical-one bit signal and a second product signal that is a product of the input encoded signal and the second reference signal. The second reference signal is filtered for passing substantially only a second dc component thereof which is squared to obtain a second output signal. Provided in the third channel are a third reference signal that is a replica of the encoded logical-zero bit signal and a third product of the input encoded signal and the third reference signal The third reference signal is filtered for passing substantially only a third dc component thereof which is squared to obtain a third output signal. Finally, provided in the fourth channel are a fourth reference signal that is, in quadrature, a replica of the encoded logical-zero bit signal and a fourth product of the input encoded signal and the fourth reference signal. The fourth reference signal is filtered for passing substantially only a fourth dc component thereof which is squared to obtain a fourth output signal.

The first and second output signals are summed to obtain a first summed output signal corresponding to the first sequence of frequencies, and similarly, the third and fourth output signals are summed to obtain a second summed output signal corresponding to the second sequence of frequencies. The first summed signal is integrated to obtain a first integrated output signal, and the second summed signal is integrated to obtain a second integrated output signal. Finally, the first and second integrated output signals are compared to each other for indicating a logical-one or logical-zero bit.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR PRACTICING THE INVENTION

Figure 1:
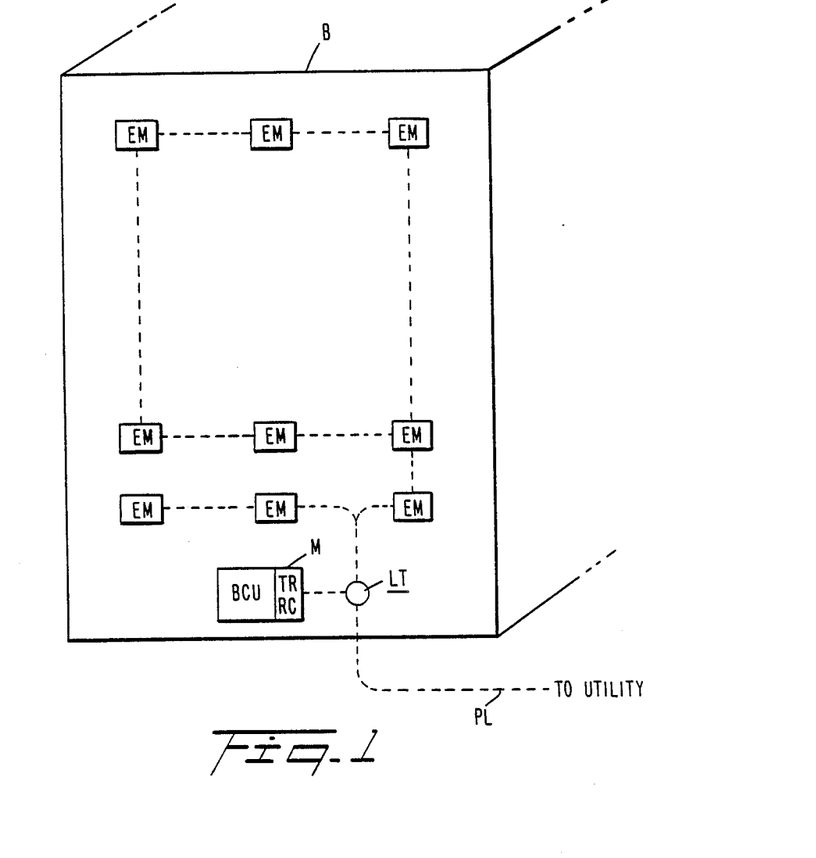
FIG. 1 is symbolic drawing of a multiple tenant building containing a large number of individual units each having an energy meter on the power lines distributed therein, and a building control unit for polling the energy meters to accumulate individualized energy consumption,. data for billing or other purpose.

With reference to FIG. 1, the environment to which the invention may be applied but is not limited, includes, as shown, an apartment building B that may have a large number of individual apartments therein, each being provided with electricity by a commercial utility over a common set of power lines PL. Distributed on the power lines PL, and located within the individual units are electricity meters EM which monitor and accumulate electricity consumption in each unit. Periodically, or on demand, the electricity meters EM are polled by a building control unit BCU centrally located in the building B and consisting of or containing a local computer which may be a "personal computer" connected to a power line modem PLM for coupling a modulated carrier signal between the BCU and the power line PL. Each electricity meter EM as well includes a modem and line interface to enable bidirectional communications between the EM. and the BCU to take place over the power lines directly if the two are on a common power transformer or through another EM or a PLM used as a bridge if the two are on different transformers.

Systems are known in the prior art for scheduling polling between a BCU and electricity meters EM as well as for routing communications among all of the electricity meters EM and the BCU directly or via intermediate meters. A self learning system for optimizing routing is described in copending application Ser. No. 07/343,644 filed Apr. 27, 1989, entitled "Network Routing and Learning Strategy for Power Carrier Communications", assigned to the assignee of this invention. The present invention is directed toward an improved frequency hopping type spread spectrum, power line carrier communication system that is easily implemented and has a very low bit error rate in the presence of substantial power line electrical noise.

Figure 3:
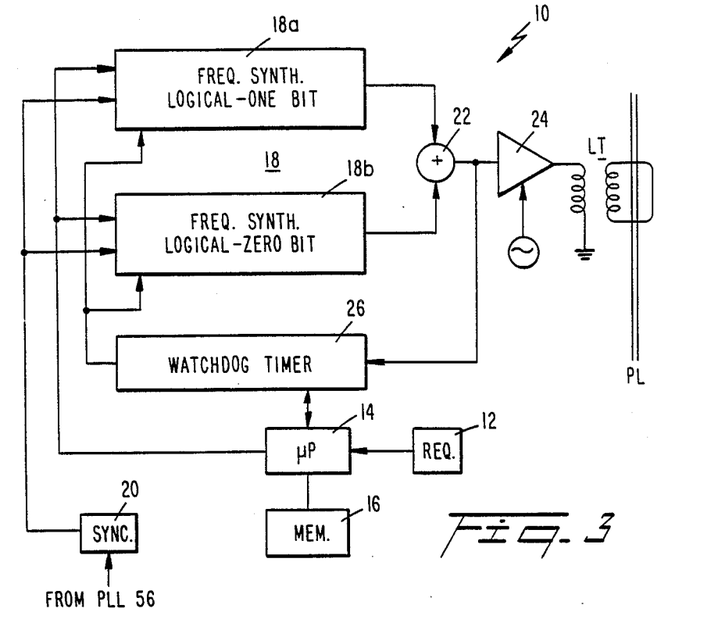
FIG. 3 is a simplified block diagram of a transmitter provided in accordance with one aspect of the invention for generating the coding frequency combinations of FIGS. 2(a) and 2(b) within the system shown in FIG. 1..
Figure 4:
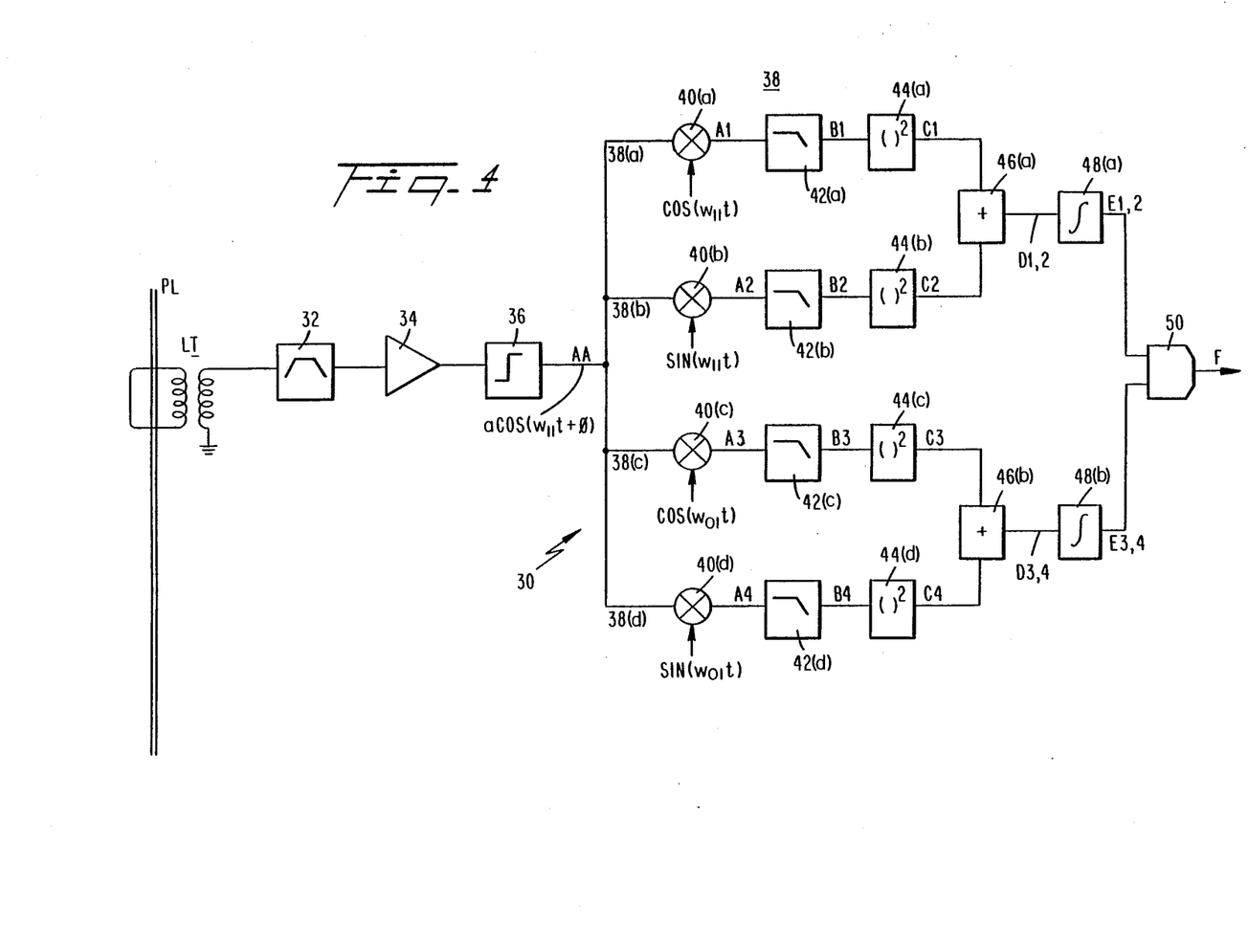
FIG. 4 is a block diagram of a receiver provided in accordance with another aspect of the invention, for carrying out homodyne, non-coherent, demodulation of the encoded carrier signals injected on the power lines by the transmitter of FIG. 3.

Within each of the electricity meters EM, there is a transmitter of a type identified by 10 in FIG. 3, coupled to the low voltage power lines PL and within the PLM, a receiver of a type identified by 30 in FIG. 4 is also coupled to the lines. Preferably, each meter EM contains a receiver 30, and the PLM also preferably contains a transmitter 10, to enable carrying out of communication routing, as described in the copending application.

Each transmitter 10, shown in FIG. 3, comprises a register 12 where information to be transmitted, such as the reading of a meter (not shown) is stored in the form of a digital word of several bits. A microprocessor 14 receives each bit for transmission and converts each bit into addresses of a memory 16 defining memory locations that store a predetermined sequence of coding frequencies to be developed by a frequency synthesizer section 18. A first predetermined frequency combination is used for coding a logical-one bit and a second predetermined frequency combination is used for coding a logical-zero bit. For each bit, the signal produced by synthesizer section 18 is of the form of a train of frequency bursts, the frequency of which varies stepwise periodically during transmission of the bit and is synchronized to the electricity on the power line by a synchronization unit 20.

Figure 2A:
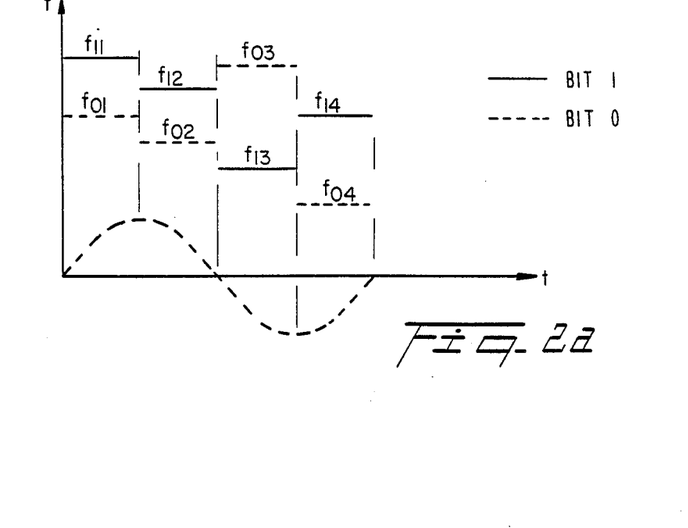
FIG. 2(a) is an example of coding combinations of logical-one and logical-zero bits using two different frequency sequences.

An example of successive frequency values used for logical-one and logical-zero bit coding is shown in FIG. 2(a). In this example, 1 and logical-zero bits are coded as sequences of four successive frequencies, or "hops" (sometimes also called "chips"). wherein a logical-one bit is coded into the sequence F11, F12, F13 and F14; these four hops are synchronized to a half cycle of electricity on power lines PL, as shown on the abscissa of the graph. Similarly, a logical-zero bit, synchronized to the electricity on line PL consists of the sequence F01, F02, F03 and F04. The number of hops forming each bit is optional; a larger number of hops per bit of further may reduce error rate but increases the complexity and processing speed requirements of the transmitter and receiver circuitry.

The choice of frequencies forming the hops also is arbitrary, although it is preferable to maintain a high degree of difference in sequences between the coded logical-one and logical-zero bits to improve synchronization between the transmitter and receiver. Accordingly, it is advantageous to code the bits such that corresponding hops, that is, frequencies within a common rank of logical-one and logical-zero bits, are different from each other. It is furthermore advantageous to separate the frequencies by a multiple of 120*n Hertz from each other where n is the number of hop per bit. In the examples shown in FIG. 2(a), the hops fall within a frequency band bounded by 50 and 150 kilohertz; the baud rate is 120 bps.

Figure 2B:
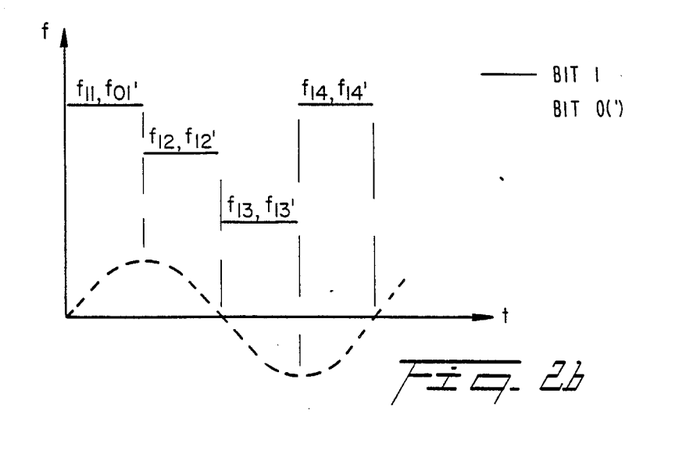
FIG. 2(b) is another example of coding frequency combinations of logical-one and logical-zero bits using the same sequence in quadrature to represent the two bits.

Another example of successive frequency values used for bit coding, shown in FIG. 2(b) provides a total of four different frequencies F11, F12, F13 and F14 comprising the sequence for a logical-one bit, and F01, F02, F03 and F04 which is the same frequency sequence, in quadrature, forms the coded logical-zero bits. In other words, the frequency of the first hop in a logical-one bit sequence (F11) is equal to the frequency of the third hop (F03) of the logical-zero bit sequence, and similarly, the frequency of the second hop in a logical-one bit sequence (F12) is equal to the frequency of the fourth hop (F04) of the logical-zero bit sequence. The same relationship holds for the remaining hops of the two sequences. In this example, the hops again are in the band bounded by 50 and 150 kilohertz; transmission is at 120 bps.

An important advantage of the coding shown in FIGS. 2(a) and 2(b) is that the coded logical-one and logical-zero bits are integrated in a common band, that is, the frequencies of the two sequences overlap with each other. This provides greater versatility than that in the Galula et al. patent.

Returning to FIG. 3, the code sequences representing logical-one and logical-zero bits are prestored in memory 16, and can be altered by programming. Addresses stored in memory 16, corresponding to the two sequences, are supplied to address inputs of a conventional frequency synthesizer 18. Frequency synthesizer 18 generates coded logical-one bits and coded logical-zero bits. The microprocessor 14 controls the code which needs to be sent to the frequency synthsizer according to what is in memory 18 and to the logical bit to send on the line. Output of the synthesizer is amplified in amplifier 24 and then injected on power lines PL through line interface transformer LI.

The frequency synthesizer 18 generates a discrete frequency signal in response to an address, e.g., an eight bit word, applied to its address input. Accordingly, to generate a coded logical-one or logical-zero bit, the frequency synthesizer will receive a sequence of words corresponding to the hops forming that bit. The frequency synthesizer 18 can be software or firmware if preferred.

In the event of a transmission failure of a type wherein the frequency synthesizer unit 18 "latches on", the entire communication network will be disabled by the continuous carrier injected on the power lines by the disabled unit. Disabling can occur as a result of either a hardware or software/firmware error. In either case, to avoid this failure mode, a watchdog timer 26 monitors the output of the frequency synthesizer unit 18. Each time the unit 18 generates a sequence, the watchdog timer 26 measures the time duration of the sequence. If the measured duration exceeds that of a predetermined sequence duration, operation of the synthesizer is presumed to be defective, and the watchdog timer 26 resets the synthesizer. Transmission so that transmission of a carrier by the transmitter 10 is thereby terminated until another transmission cycle takes place.

Referring now to FIG. 4, receiver 30 in each meter EM monitors the power lines PL at line interface transformer LI. The signal detected by the transformer is applied to a bandpass filter 32 that minimizes the amount of noise detected on the power lines by limiting the frequency of line signals to be processed in the receiver. As an example, the bandpass filter 32 preferably attenuates network low frequencies, principally the network frequency and its harmonics, and limits the upper band beyond the highest coding frequency used, e.g., approximately 100–150 kHz. The output of filter 32 is amplified by an amplifier 34 and conditioned by a limiter 36 to eliminate signals detected on the power lines that extend beyond the normal operating range of the receiver.

The output of limiter 36, identified in FIG. 4 as AA, is a conditioned replica of the modulated carrier injected on power lines PL by the transmitter 10, and has the form $$a \cdot \cos(w11\, t + phi) \tag{1}$$

assuming that a logical-one bit is received.

Figure 5:
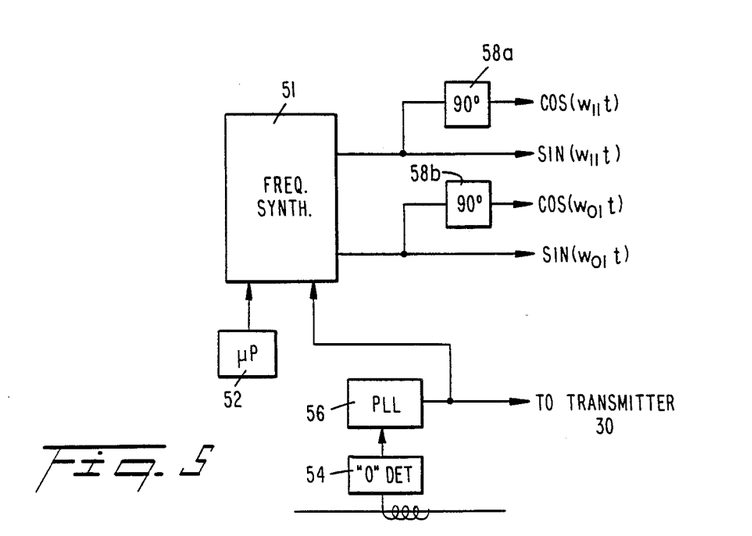
FIG. 5 is a diagram of the circuit for generating the four reference signals shown in FIG. 4, and for synchronizing the receiver and transmitter to zero crossings on the power lines.

Node AA forms an input of a non-coherent, homodyne demodulator circuit in accordance with the invention, for accurately detecting logical-one and logical-zero bits received by the receiver 30. The demodulator, identified generally by 38, carries out demodulation in four frequency channels 38(a), 38(b), 38(c) and 38(d). Within each channel, the input channel at AA is multiplied by a reference signal developed by a local generator, shown in FIG. 5. A first multiplier 40(a) in channel 38(a) multiplies the input signal at node AA by first locally generated reference signal cos(w11t) that corresponds to the frequencies forming a logical-one sequence. This sequence of frequencies is generated by frequency synthesizer 51(a) in FIG. 5, and is resident at the receiver. The output of multiplier 40(a) at line A1 of the first channel 38(a) therefore is $$a \cdot \cos(w11t + phi) \cdot \cos(w11t) \tag{3}$$

The second multiplier 40(b) in channel 38(b) obtains the product of the input signal at node AA and a second reference signal sin(w1lt) developed by frequency synthesizer 51(a); the second reference signal thus is a replica of, and is in quadrature with, the first reference signal. The output of the second multiplier 40(b) on line A2 of the second channel 38(b) accordingly is $$a \cdot \cos(w11t + phi) \cdot \sin(w11t) \quad (3)$$

Similarly, the third and fourth reference signals applied to multipliers 40(c) and 40(d) correspond to a logical-zero sequence of frequencies. The third and fourth reference signals in channels 38(c) and 38(d) thus respectively are cos(w01t) and sin(w01t). both generated by the frequency synthesizer 51(b) in FIG. 5. The fourth reference signal in channel 38(d) is a replica of, and is in quadrature with, the third reference signal in third channel 38(c).

The four reference signals generated by frequency synthesizers 51(a) and 51(b) (FIG. 5) are controlled by a microprocessor 52, and the synthesizers are synchronized to electricity on the power lines by a zero crossover detector 54 for synchronizing a phase locked loop 56. Since zero crossover detectors 54 and phase lock loops 56 are well known to persons skilled in the art, no details are provided herein. Quadrature reference signals are derived from signals on other channels by phase shifters 58(a) and 58(b) in the manner shown.

The signals on lines A3 and A4, respectively, are as follows:

$$a \cdot \cos(w11t + phi) \cdot \cos(w01t) \quad (4)$$

$$a \cdot \cos(w11t + phi) \cdot \sin(w01t) \quad (5)$$

Equations (2) to (5) can be expanded respectively as follows:

| | |
|---|---|
| $a/2 \cdot (\cos(2w11t + phi)t + \cos(phi))$ | (6) |
| $a/2 \cdot (\sin(2w11t + phi)t + \sin(phi))$ | (7) |
| $a/2 \cdot (\cos[(w11 + w01)t + phi] + \cos[(w11 - w01)t + phi])$ | (8) |
| $a/2 \cdot (\sin[(w11 + w01)t + phi] + \sin[(w11 - w01)t + phi])$ | (9) |

The signals on lines B1–B4 of the four channels 38(a)-(d) are applied to low pass filters 42(a)–42(d), to pass only dc components therethrough. Accordingly, the ac components in equations (6)–(9) are eliminated, follows:

| | |
|---|---|
| $a/2 \cdot (\cos(phi))$ | (10) |
| $a/2 \cdot (\sin(phi))$ | (11) |
| 0 | (12) |
| 0 | (13) |

It can be determined from equations (10)–(13) that a sideband of the input signal at AA is impressed either on lines B1 and B2 of channels 38(a) and 38(b) or on lines B3 and B4 of channels 38(c) and 38(d). depending upon whether an encoded logical-one bit signal or an encoded logical-zero bit signal is received. The signals on lines B1 and B2 are in quadrature with each other, and similarly, the signals on lines B3 and B4 are in quadrature.

The outputs of low pass filters 42(a)–(d) are applied to respective squaring circuits 44(a)–(d), so that the signals on lines C1, C2, C3 and C4 are, respectively, $(a/2)^2\cos^2(phi)$, $(a/2)^2\sin^2(phi)$, 0 and 0. The outputs of squaring circuits 44(a)–(d) in turn are applied to first and second summers 46(a) and 46(b). Specifically, the outputs of the squaring circuits 44(a) and 44(b) in the first and second channels 38(a), 38(b) are added together in 46(a), so that the signal on line D1,2 is as shown in equation (14)

| | | |
|---|---|---|
| | $a/4 \cdot (\cos^2(phi) + \sin^2(phi)) = a/4$ | (14) |
| since | $\cos^2(phi) + \sin^2(phi) = 1$ | (15) |

Similarly, the outputs of squaring circuits 44(c), 44(d) are added together in 46(b), so that the signal on line D3,4 is as shown in equation (14)

$$0 \quad (16)$$

Thus, the signal on either output line D1,2 or output line D3,4, depending upon whether a logical-one bit or logical-zero bit is received by the receiver 30, is a2.

Accordingly, if a logical-one bit signal is received, a dc signal having a magnitude a/4 applied on line D1,2 is integrated in integrator circuit 48b; the signal on the other output line D3,4, attributable to noise, is applied to integrator 48(b). The integration period of integrators 48(a) and 48(b) is equal to the number of hops per bit, e.g., four in the examples shown in FIGS. 2(a) and (b). The outputs of the integrators on output lines E1,2 and E3,4 are supplied to the inputs of a comparator 50 which applies a signal, on which indicates whether a logical-one bit or logical-zero bit signal has been received on output line F.

The comparator 50 accordingly determines whether the signals accumulated on channels 38(a) and 38(b) during a bit sequence are greater or less than the signals on channels 38(c) and 38(d). If the magnitude is greater, the bit received is deemed to be, e.g., a logical-one and if the magnitude is less the received bit in this example is considered to be a logical-zero bit.

Of particular importance to the invention, a bit decision is not made by comparing energy content in the logical-one bit and logical-zero bit channel pairs instead, the magnitudes of signals on output lines D1,2 and D3,4 are summed through all hops of a bit sequence and then a bit decision is made. In the examples of FIGS. 2(a) and 2(b), a bit decision is made once for each four hop sequence. This technique eliminates the bit determination ambiguities inherent in the Gulala et al patent, supra.

Considering bit determination in more detail, the circuit of FIG. 4 compares the sum of four samples on each output line E1,2 and E3,4. The difference is determined in comparator 50, and if the difference is greater than that attributable to noise, a logical-one bit or logical-zero bit determination is made.

Figure 6:
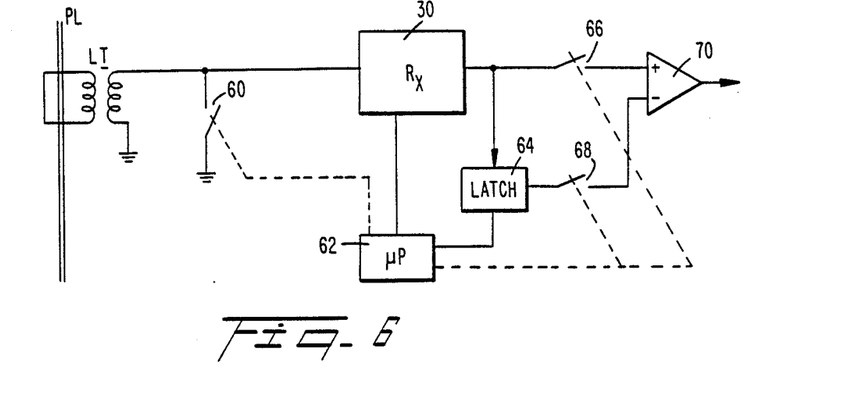
FIG. 6 is a circuit diagram of offset compensation for compensating offset voltages produced in the demodulation channels of the receiver shown in FIG. 4.

The level of noise, which forms a calibration reference for the receiver 30, is determined on a regular basis which can be advantageously chosen equal to one hour. Noise on lines E1,2 and E3,4 are in the form of dc signals that are imparted as offset voltage as a result of voltage imbalances within components of the receiver 30. Offset detection and correction circuitry, shown in FIG. 6, for reducing the magnitude of this offset voltage comprises a first controlled switch 60 in shunt with the input of the receiver 30. At the beginning of a calibration cycle, the switch 60 is closed, connecting the input of the receiver 30 to ground whereby any dc output level from the receiver is attributable only to noise. This dc level is stored in a microprocessor 62, thereafter, during the operation mode of the receiver, microprocessor 62 subtracts the stored offset from the signal output of receiver 30. Offset compensation thus is carried out as each bit is received.

Figure 7:
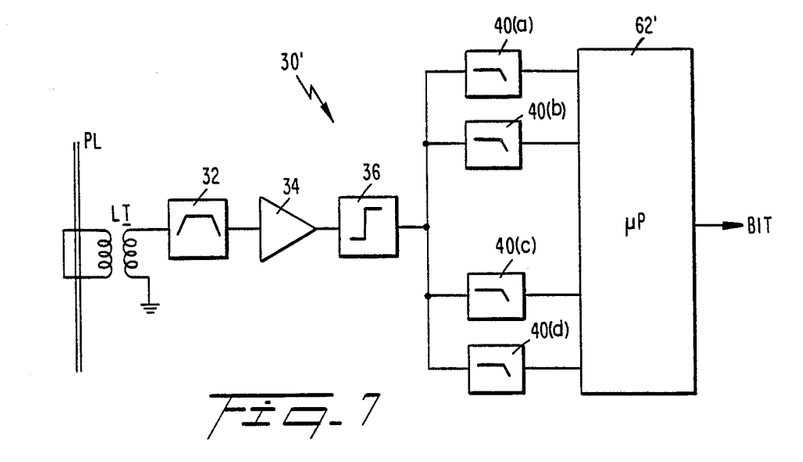
FIG. 7 is a circuit diagram of the receiver having software implemented demodulation functions.

In accordance with another embodiment of the invention, receiver 30,, shown in FIG. 7, has a demodulation section that is at least partially software or firmware implemented. Therein, microprocessor 62, is programmed to carry out the functions at least of squaring circuits 44, summers 46, integrators 48 and comparators 50. Programming of a microprocessor to carry out the functions of those circuits, as described supra, is well known to persons skilled in the art.

There accordingly has been described a power line carrier communication system particularly well suited to transmission of metered energy consumption data for utility billing, wherein transmission of data is in the form of frequency hopping type spectrum transmission and signal demodulation and wherein logical-one and logical-zero encoded bits are in the form of frequency sequences that are integrated into a single band. Demodulation is carried out by a homodyne, non-coherent, quadratic demodulator that converts the modulated carrier directly into corresponding dc levels without intermediate frequency conversion. Voltage offset, that characteristically induces error into homodyne demodulators, is compensated by calibration circuitry, and as a result of integrating the frequency hops throughout a bit sequence before making the determination, bit error rate is substantially less than that in the prior art.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A system for wideband transmission of data on an electricity distribution network, comprising:
   at least one transmitter including means for generating encoded signals corresponding respectively to logical-one bits and logical-zero bits, each encoded signal corresponding to a logical-one bit consisting of a first predetermined, unrelated sequence of frequencies and each encoded signal corresponding to a logical-zero bit consisting of a second, different predetermined and unrelated sequence of frequencies;
   means for coupling said encoded signals on said electricity distribution network; and
   at least one receiver having means for receiving from said at least one transmitter, input encoded signals on said electricity distribution network, and a homodyne, non-coherent demodulator including
   (a) first demodulator means having first and second channels for demodulating said logical-one bit signals, said first demodulator means comprising, (i) in said first channel, a first local signal generator means for providing a first reference signal that is a replica of said encoded logical-one bit signal, first multiplier means for forming a product of said input encoded signal and said first reference signal, first filter means coupled to an output of said first multiplier means for passing substantially only a first dc component therefrom, and first squaring means for squaring said first dc component, and (ii) in said second channel, a second local signal generator means for providing a second reference signal that is, in quadrature, a replica of said encoded logical-one bit signal, second multiplier means for forming a product of said input encoded signal and said second reference signal, second filter means coupled to an output of said second multiplier means for passing substantially only a second dc component therefrom, second squaring means for squaring said second dc component; first summer means for summing outputs of said first and second squaring means and first integrator means for accumulating from said first summer means first output signals corresponding to said first sequence of frequencies,
   (b) second demodulator means having third and fourth channels for demodulating said logical-zero bit signals, said third demodulator means comprising, (i) in said third channel, a third local signal generator means for providing a third reference signal that is a replica of said encoded logical-zero bit signal, third multiplier means for forming a product of said input encoded signal and said third reference signal, third filter means coupled to an output of said third multiplier means for passing substantially only a third dc component therefrom, and third squaring means for squaring said third dc component, and (ii) in said fourth channel, a fourth local signal generator means for providing a fourth reference signal that is, in quadrature, a replica of said encoded logical-zero bit signal, fourth multiplier means for forming a product of said input encoded signal and said fourth reference signal, fourth filter means coupled to an output of said fourth multiplier means for passing substantially only a fourth dc component therefrom; fourth squaring means for squaring said fourth dc component; second summer means for summing outputs of said third and fourth squaring means and second integrator means for accumulating from said second summer means second output signals corresponding to said second sequence of frequencies, and
   (c) comparator means for comparing output signals from said first and second integrator means for indicating a logical-one or logical-zero bit.

2. The system of claim 1, including synchronization means for synchronizing said at least one receiver with said at least one transmitter.

3. The system of claim 1, wherein said at least one receiver and said at least one transmitter are synchronized to electricity on said electricity distribution network.

4. The system of claim 3, wherein said synchronization means includes zero crossing detector means synchronized to zero crossings of electricity on said electricity distribution network for generating line synchronization pulses.

5. The system of claim 4, including a phase locked loop responsive to said line synchronization pulses for controlling said encoded signals generating means.

6. The system of claim 1, including limiter means for limiting said input signal applied to said receiver.

7. The system of claim 1, including transformer means for coupling said encoded signals from said electricity distribution network to said receiver, and further including a band pass filter between said transformer and said receiver.

8. The system of claim 1, wherein said encoded signals generating means includes first and second frequency synthesizers for generating respectively said logical-one and logical-zero encoded signals.

9. The system of claim 1, wherein each of said sequences consists of four frequency "hops".

10. The system of claim 9, wherein the integration period of each of said first and second integrator means is four said "hops".

11. The system of claim 1, including offset compensation means for compensating said receiver for an error voltage developed as a result of receiver component offsets.

12. The system of claim 11, wherein said offset compensation means includes means for shunting an input of said receiver to provide a "zero input" thereto whereby the output voltage developed by said receiver is attributed only to offset voltage produced therein, means for latching said output offset voltage and means responsive to said latching means for compensating the output of said receiver.

13. A method of wideband transmission of data on an electricity distribution network, comprising the steps of:

generating encoded signals corresponding respectively to logical-one bits and logical-zero bits, each encoded signal corresponding to a logical-one bit consisting of a first predetermined, unrelated sequence of frequencies and each encoded signal corresponding to a logical-zero bit consisting of a second, different predetermined, unrelated sequence of frequencies;

coupling said encoded signals on said electricity distribution network; and receiving input encoded signals on said electricity distribution network, said step of receiving including the steps of (a) establishing first and second frequency channels for demodulating said logical-one bit signals and third and fourth channels for demodulating said logical-zero bit signals;

(b) in said first channel, providing a first reference signal that is a replica of said encoded logical-one bit signal, forming a first product signal that is a product of said input encoded signal and said first reference signal, filtering said first product signal for passing substantially only a first dc component thereof and squaring said first dc component to obtain a first output signal;

(c) in said second channel, providing a second local signal that is, in quadrature, a replica of said encoded logical-one bit signal, forming a second product signal that is a product of said input encoded signal and said second reference signal, filtering said second product signal for passing substantially only a second dc component thereof and squaring said second dc component to obtain a second output signal;

(d) in said third channel, providing a third reference signal that is a replica of said encoded logical-zero bit signal, forming a third product of said input encoded signal and said third reference signal, filtering said third product signal for passing substantially only a third dc component thereof and squaring said third dc component to obtain a third output signal; and (e) in said fourth channel, providing a fourth reference signal that is, in quadrature, a replica of said encoded logical-zero bit signal, forming a fourth product of said input encoded signal and said fourth reference signal, filtering said fourth product signal for passing substantially only a fourth dc component thereof and squaring said fourth dc component to obtain a fourth output signal;

(f) summing said first and second output signals to obtain a first summed output signal corresponding to said first sequence of frequencies;

(g) summing said third and fourth output signals to obtain a second summed output signal corresponding to said second sequence of frequencies;

(h) integrating said first summed signal to obtain a first integrated output signal;

(i) integrating said second summed signal to obtain a second integrated output signal; and (j) comparing said first and second integrated output signals for indicating a logical-one or logical-zero bit.

14. The method of claim 14, including the steps of synchronizing the transmitting and receiving steps.

15. The method of claim 14, wherein said synchronizing step comprises synchronizing the transmitting and receiving steps to electricity on said electricity distribution network.

16. The method of claim 16, wherein said synchronization step includes the step of zero crossing detection synchronized to zero crossings of electricity on said electricity distribution network for generating line synchronization pulses.

17. The method of claim 16, including the step of using said line synchronization pulses for controlling said step of generating said encoded signals.

18. The method of claim 17, including the step of limiting the magnitude of said input encoded signals.

19. The method of claim 14, including the step of coupling said encoded signals from said electricity distribution network and further including band pass filtering encoded signals coupled from said network.

20. The method of claim 13, wherein said step of generating encoded signals includes generating first and second frequency synthesized signals corresponding respectively to said logical-one and logical-zero encoded signals.

21. The method of claim 13, wherein each of said sequences consists of four frequency "hops".

22. The system of claim 21, wherein the integration period of each of said first and second integration steps is four said "hops".

23. A system for wideband transmission of data on an electricity distribution network, comprising:

at least one transmitter including means for generating encoded signals corresponding respectively to logical-one bits and logical-zero bits, each encoded signal corresponding to a logical-one bit consisting of a first predetermined, unrelated sequence of frequencies and each encoded signal corresponding to a logical-zero bit consisting of a second, different predetermined, unrelated sequence of frequencies;

means for coupling said encoded signals on said electricity distribution network;

at least one receiver having means for receiving from said at least one transmitter, input encoded signals on said electricity distribution network, and a homodyne demodulator including first demodulator means in a first frequency channel means for converting said logical-one bit signals into corresponding first dc signals, second demodulator means in a second frequency channel means for converting said logical-zero signals into corresponding second dc signals;

offset compensation means coupled to said receiver for compensating any error voltage developed by said receiver as a result of offset voltage produced by components of said receiver; and comparator means for comparing output signals from said first and second channel means for indicating a logical-one or logical-zero bit.

24. The system of claim 23, wherein said offset compensation means includes means for shunting an input of said receiver to provide a "zero input") thereto whereby an output voltage developed by said receiver is attributed only to offset voltage produced therein, means for latching said output offset voltage and means responsive to said latching means for compensating an output of said receiver.

25. The system of claim 24, wherein said input shunting means comprises a first switch, and wherein said offset compensation means further includes a differential amplifier means, second switch means for supplying an uncompensated output voltage from said receiver to one input of said differential amplifier means and third switch means for supplying an output of said latch means to another input of said differential amplifier means.

26. The system of claim 24, wherein said first demodulator means has first and second channels for demodulating said logical-one bit signals, said first demodulator means comprising, (i) in said first channel, a first local signal generator means for providing a first reference signal that is a replica of said encoded logical-one bit signal, first multiplier means for forming a product of said input encoded signal and said first reference signal, first filter means coupled to an output of said first multiplier means for passing substantially only a first dc component therefrom, and first squaring means for squaring said first dc component, and (ii) in said second channel, a second local signal generator means for providing a second reference signal that is, in quadrature, a replica of said encoded logical-one bit signal, second multiplier means for forming a product of said input encoded signal and said second reference signal, second filter means coupled to an output of said second multiplier means for passing substantially only a second dc component therefrom, second squaring means for squaring said second dc component; first summer means for summing outputs of said first and second squaring means and first integrator means for accumulating from said first summer means first output signals corresponding to said first sequence of frequencies, and wherein said second demodulator means has third and fourth channels for demodulating said logical-zero bit signals, said third demodulator means comprising, (i) in said third channel, a third local signal generator means for providing a third reference signal that is a replica of said encoded logical-zero bit signal, third multiplier means for forming a product of said input encoded signal and said third reference signal, third filter means coupled to an output of said third multiplier means for passing substantially only a third dc component therefrom, and third squaring means for squaring said third dc component, and (ii) in said fourth channel, a fourth local signal generator means for providing a fourth reference signal that is, in quadrature, a replica of said encoded logical-zero bit signal, fourth multiplier means for forming a product of said input encoded signal and said fourth reference signal, fourth filter means coupled to an output of said fourth multiplier means for passing substantially only a fourth dc component therefrom; fourth squaring means for squaring said fourth dc component; second summer means for summing outputs of said third and fourth squaring means and second integrator means for accumulating from said second summer means second output signals corresponding to said second sequence of frequencies.

27. The system of claim 26 wherein at least said first through fourth squaring means, said first and second summing means, said first and second integrator means and said comparator means are software implemented.

* * * * *